United States Patent Office 3,781,355
Patented Dec. 25, 1973

3,781,355
PESTICIDAL COMPOUNDS AND COMPOSITIONS
Ian Robert Harrison, Bleasby, John Felix McCarthy, Bramcote Hills, and Bryan Harper Palmer, Burton Joyce, England, assignors to Boots Pure Drug Company Limited, Nottingham, England
No Drawing. Continuation-in-part of abandoned application Ser. No. 430, Jan. 2, 1970. This application Dec. 1, 1970, Ser. No. 94,209
Claims priority, application Great Britain, Dec. 12, 1969, 60,793/69; Aug. 26, 1970, 41,120/70
Int. Cl. C07c 123/00
U.S. Cl. 260—564 R            7 Claims

ABSTRACT OF THE DISCLOSURE

Novel 1,5-diphenyl - 3 - methyl-1,3,5-triazapenta-1,4-dienes, processes for their production and pesticidal, especially acaricidal and insecticidal, compositions and methods are described.

Preferred compounds are particularly active against cattle tick and red spider mite.

---

This application is a continuation-in-part of Ser. No. 430, filed Jan. 2, 1970, now abandoned.

This invention relates to new chemical compounds with pesticidal properties.

According to one feature of the present invention there are provided new compounds of the general formula

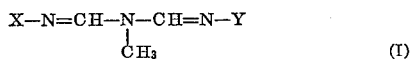

in which X and Y, which may be identical or different, are 2,3-dimethylphenyl, 2,4-dimethylphenyl, 2,6-dimethylphenyl, 2,4,6-trimethylphenyl, 2,4,5-trimethylphenyl, 2,3,4-trimethylphenyl, 2-methyl-4-halophenyl, 2-ethyl-4-halophenyl, 2-halo-4-methylphenyl, 2-halo-4,6-dimethylphenyl, 2,4-dihalo-6-methylphenyl, 2-methyl-4-methoxyphenyl, phenyl or methylphenyl, provided that (a) when X and Y are identical, they are not phenyl or methylphenyl and (b) when X and Y are different, at least one of them is 2,3-dimethylphenyl, 2,4-dimethylphenyl, 2,4,6-trimethylphenyl, 2,3,4-trimethylphenyl, 2-methyl-4-halophenyl or 2-halo-4-methylphenyl. Preferred compounds are those in which X and Y are identical. The term "halo" designates chloro, bromo or fluoro.

According to another feature of the present invention there is provided a process for the preparation of a compound of the hereinbefore defined general Formula I which comprises the condensation of a formamidine of the general formula

in which X is as hereinbefore defined with a formamidine of the general formula

in which Y is as hereinbefore defined. When X and Y are identical, this process comprises the condensation of two molecules of the same formamidine.

The condensation may be effected in the absence of any condensing agent by heating the formamidine or mixture of formamidines at a suitable temperature, preferably in solution in a suitable inert organic solvent, for example xylene, toluene or chlorobenzene. In the absence of a condensing agent, a suitable reaction temperature for the condensation is generally within the range 50–200° C., especially 70–180° C. An especially suitable reaction temperature is 130–150° C., and good results are generally achieved in a convenient manner by refluxing a solution of the formamidine or mixture of formamidines in xylene, for example commercially available mixed isomeric xylenes, B.P. 137–140° C.

The condensation may also be effected in the presence of a suitable condensing agent, for example dimethylcarbamoyl chloride, dimethylthiocarbamoyl chloride, ethyl trifluoroacetate or ethyl trichloroacetate. These condensing agents influence the temperature at which the condensation may be carried out in some instances, for example when X and Y are 2,4-dimethylphenyl, it is possible to effect the condensation at ambient temperature in the presence of the hereinbefore described condensing agents. The hereinbefore described condensing agents are suitably used in an amount of approximately one molecular proportion based on the total molecular quantity of formamidine or mixture of formamidines used, although larger amounts of ethyl trifluoroacetate or ethyl trichloroacetate may be advantageous, especially at ambient or near ambient temperatures.

When dimethylcarbamoyl chloride or dimethylthiocarbamoyl chloride is used as a condensing agent, it is preferred to include a suitable acid-binding agent, for example triethylamine, in the reaction mixture in order to absorb the hydrogen chloride produced in the reaction.

The formamidines of the general Formulae II and III are compounds of known type which may be prepared by known methods, for example by reacting the appropriate arylamine hydrochloride with N-methylformamide in the presence of benzenesulphonyl chloride or p-toluenesulphonyl chloride. Another known method for preparing these formamidines consists of reacting the appropriate ethyl formimidate with methylamine.

Depending upon the methods used for the recovery and purification of the formamidine, it may be obtained as a compound containing traces of free alkali. It is desirable that such free alkali should be removed from the formamidine before effecting the hereinbefore described condensation in the absence of a condensing agent since free alkali, even in trace amounts, is detrimental to the condensation. Traces of free alkali may be removed from the formamidine by further purification, or by neutralization with an acid such as, for example, benzenesulphonic acid, p-toluenesulphonic acid or sulphamic acid. An amount of acid of 0.01–0.05 equivalent per mole of formamidine is generally suitable.

According to another feature of the present invention there is provided a process for the preparation of a compound of the hereinbefore defined general Formula I which comprises reacting a formamidine of the general formula

in which X is as hereinbefore defined with a formimidate of the general formula

in which Y is as hereinbefore defined and R is alkyl containing 1-4 carbon atoms, preferably ethyl.

The reaction may be effected by heating a mixture of the reactants. A suitable reaction temperature generally lies within the range 40–150° C., especially 50–120° C.

The reaction may be effected simply by heating a mixture of the formamidine and formimidate, or by heating a solution of the reactants in a suitable organic solvent that is inert to the conditions of the reaction, for example acetonitrile, benzene, toluene, xylene or chlorobenzene.

The formimidates of the general Formula IV are compounds of known type which may be prepared by known methods, for example by reacting an arylamine of the general formula Y—NH$_2$ with alkyl orthoformate.

In effecting the hereinbefore described reaction between formamidine and formimidate, these reactants may be added as such to form a reaction mixture, or in some instances may be formed in the reaction mixture from a suitable mixture of starting materials. Thus, for example, the reaction between formamidine and formimidate may be effected as follows:

(a) By mixing a formamidine of the general Formula II with a formimidate of the general Formula IV and heating the mixture.

(b) By heating methylamine with approximately two molecular proportions of the appropriate ethyl formimidate, for example by heating the reactants under autogenous pressure in a closed vessel. A suitable reaction temperature is generally within the range 40–150° C., especially 50–120° C.

(c) By heating a mixture of an arylamine of the general formula YNH₂ in which Y is as hereinbefore defined, a formamidine of the general formula

X—N=CH—NHCH₃

(II) in which X is as hereinbefore defined, and ethyl orthoformate. A minor proportion of a suitable acid, for example glacial acetic acid, should be included in the reaction mixture, since the reaction between arylamine and ethyl orthoformate is known to be catalyzed by acid. The three reactants are suitably used in approximately equimolecular proportions, although it may be advantageous to use an excess of ethyl orthoformate. A suitable reaction temperature generally lies within the range 40–150° C., especially 50–120° C. In carrying out the reaction, it is convenient to add the arylamine YNH₂ to a heated mixture of the other two reactants.

According to another feature of the present invention there is provided a process for the preparation of a compound of the hereinbefore defined general Formula I which comprises reacting a formamidine of the general formula

X—N=CH—NHCH₃     (II)

with an isocyanide of the general formula

Y—NC     (V)

in which Y is as hereinbefore defined.

The reaction may be effected by heating the reactants in the presence of a suitable catalyst, for example cuprous oxide, cupric oxide or cuprous chloride. A suitable reaction temperature is generally within the range 40–150° C., especially 50–120° C. The reaction may be carried out in the presence of a suitable organic solvent that is inert to the conditions of the reaction, for example benzene, toluene or acetonitrile, but is suitably carried out in the absence of such a solvent.

The formamidine reactant of the general Formula II may be prepared by reacting the isocyanide of the general Formula V with methylamine in the presence of a suitable catalyst, for example cuprous oxide or cuprous chloride. It may be convenient to react this formamidine, without isolation, with a further quantity of the isocyanide to form the desired compound of the general Formula I.

A suitable amount of catalyst for use in the hereinbefore described catalytic reactions with an isocyanide is generally within the range 0.001–0.4 molecular proportions, especially 0.01–0.2 molecular proportions, based on the isocyanide of the general Formula V.

The isocyanides of the general Formula V are compounds of known type which may be prepared by known methods, for example by reacting the appropriate formanilide with phosgene.

The unsymmetrical compounds of the present invention are formed by operating the hereinbefore described processes of the present invention using reactants in which X differs from Y. When X differs from Y, the reaction product of the general Formula I is generally formed as a mixture of two symmetrical compounds and one unsymmetrical compound. These three compounds may be represented by the following general formulae:

X'—N=CH—N—CH=N—X'
         |
         CH₃     (VI)

Y'—N=CH—N—CH=N—Y'
         |
         CH₃     (VII)

X'—N=CH—N—CH=N—Y'
         |
         CH₃     (VIII)

in which X' and Y' have the hereinbefore defined values of X and Y, with the proviso that X' and Y' are different.

In operating the hereinbefore described processes of the present invention, it is preferred to use reactants in which X and Y are identical in order to produce the product of the general Formula I as a single compound. This compound may be recovered in a conventional manner and is preferably recovered in a substantially pure form.

We have found that the compounds of the hereinbefore defined general Formula I have valuable pesticidal properties. For example, the compounds have acaricidal properties, as shown by their activity against the larvae of cattle ticks, for example the larvae of *Boophilus microplus*. Accordingly the compounds are useful for combating cattle ticks such as *Boophilus microplus*. Thus according to a further feature of the present invention there is provided a method for protecting cattle from cattle ticks which comprises treating the cattle externally with a compound of the hereinbefore defined general Formula I.

Preferred compounds of the present invention, which have a high level of activity against the larvae of *Boophilus microplus*, are listed in the following Table 1. In these compounds X and Y are identical and have the values shown.

TABLE 1

| Compound: | X and Y |
|---|---|
| A | 2,4-dimethylphenyl. |
| B | 2,3-dimethylphenyl. |
| C | 2-bromo-4-methylphenyl. |
| D | 2-fluoro-4-methylphenyl. |
| E | 2,4,6-trimethylphenyl. |
| F | 2,3,4-trimethylphenyl. |
| G | 2-chloro-4,6-dimethylphenyl. |
| H | 4-chloro-2-methylphenyl. |
| I | 4-fluoro-2-methylphenyl. |

The compounds listed in Table 1 also have activity against gravid females of *Boophilus microplus*, as shown by a suppressive effect on egg laying. Compound A has an especially high level of activity against larvae and gravid females of *Boophilus microplus* and is an especially preferred compound of the present invention.

We have also found that some of the compounds of the present invention possess acaricidal activity against phytophagous spider mites, for example red spider mites such as, for example, *Tetranychus spp*. For example, Compound A in Table 1 and the compound of the general Formula I in which X and Y are 2,4,5-trimethylphenyl (Compound J) have activity against eggs, larvae and adults, especially eggs and larvae, of *Tetranychus urticae*. Compound A also has activity against *Tetranychus citri* and *Panonycus ulmi*. Thus according to a further feature of the present invention there is provided a method for protecting plants from phytophagous spider mites which comprises treating the locus of the plants, i.e. the plants or their habitat, with a compound of the general Formula I in which X and Y are identical and are 2,4-dimethylphenyl or 2,4,5-trimethylphenyl. Such plants include, for example, crops such as fruit trees and vegetables, and ornamental plants, for example chrysanthemums. A suitable application rate of these compounds is generally within the range 0.05–100 lb./acre, more usually 0.1–10 lb./acre.

We have also found that Compound A in Table 1 and Compound J possess insecticidal activity. For example, these compounds have activity against scale insects, for example California red scale. Compound A also has activity against aphids, for example *Megoura viciae* and *Aphis fabae*.

The compounds of the hereinbefore defined general Formula I may be designated chemically as triazapentadienes. In accordance with this designation, Compound A in Table 1 is 1,5-di-(2,4-dimethylphenyl)-3-methyl-1,3,5-triazapenta-1,4-diene.

According to a further feature of the present invention there are provided pesticidal, especially acaricidal, compositions which comprise as an active ingredient a compound of the hereinbefore defined general Formula I in association with a diluent or carrier. The diluent or carrier may be a solid or liquid, optionally together with a surface-active agent, for example a dispersing agent, emulsifying agent or wetting agent.

The compositions of the invention include not only compositions in a suitable form for application but also concentrated primary compositions which may be supplied to the user and which require dilution with a suitable quantity of water or other diluent before application. Typical compositions of the invention include, for example, dusting powders, dispersible powders, solutions, emulsifiable concentrates, dispersions and emulsions, aerosols and smokes.

A dusting powder comprises the active ingredient intimately mixed with a solid pulverulent diluent, for example kaolin.

A dispersible powder comprises the active ingredient in finely divided form in association with one or more dispersing agents so that a stable aqueous dispersion of the active ingredient is formed on mixing the powder with water. A finely divided inert solid diluent such as kaolin or celite is generally incorporated in the dispersible powder.

In the dusting powders and dispersible powders, the active ingredient is in the form of fine particles; preferably the majority of the particles, of the order of at least 95%, should be less than $50\mu$, with about 75% of them being $5-20\mu$.

An emulsifiable concentrate, also known as a "miscible liquid," comprises a solution of the active ingredient in a water-immiscible solvent in association with one or more emulsifying agents. An emulsion is formed when the emulsifiable concentrate is mixed with water.

The compositions of the invention may be applied to the ground, for example ground areas around dairies, in order to combat cattle ticks thereon. However in the combating of cattle ticks it is preferred to use the compositions of the invention for the external treatment of cattle. It will be appreciated that for this use the diluent or carrier chosen should be such that the compositions applied to the cattle are substantially non-toxic and non-irritant to the cattle.

Preferred compositions for use in the external treatment of cattle are cattle dips. By the term "cattle dips" is meant compositions which contain an active ingredient in association with a diluent or carrier, the nature of the diluent or carrier and its proportion being such that, on dilution with an appropriate quantity of water, stable aqueous compositions are produced that are suitable for the treatment of cattle by the conventional procedures of dipping and spraying. The cattle dips of the present invention may take the form, for example, of dispersible powders or emulsifiable concentrates.

The hereinbefore described compositions of the present invention may be prepared by techniques that are well known in the art of formulating pesticidal compounds.

The concentration of the compound of the general Formula I in the hereinbefore mentioned primary compositions of the present invention may vary widely and may be, for example, 5-95% w./w. of the composition, depending on the physical properties of the ingredients.

The concentration of the compound of the general Formula I in the compositions for application to combat the hereinbefore mentioned pests will generally be within the range 0.001-10% w./w., more usually 0.005-5% w./w.

The compositions of the present invention may contain as active ingredients more than one compound of the general Formula I, and may contain a mixture of symmetrical and unsymmetrical compounds of the general Formula I. The compositions of the present invention may also contain one or more additional pesticides, for example one or more fungicides, additional insecticides or additional acaricides. Such an additional pesticide may be, for example, an organophosphorus compound such as azinphos-ethyl, azinphos-methyl, fenitrothion, phosalone, dioxathion, supona, coumaphos, bromophos-ethyl or dursban; a carbamate such as carbaryl, methiocarb or arprocarb; a bridged diphenyl compound such as tedion, tetrasul, chlorbenside or DDT; or a chlorinated hydrocarbon such as benzene hexachloride or toxaphene.

In the compounds of the present invention, when X and/or Y is 4-halo-2-methyl or 4-halo-2-ethyl, the 4-halo substituent is preferably chloro or fluoro. When X and/or Y is 2-halo-4-methyl, the 2-halo substituent is preferably bromo or fluoro.

The following non-limitative examples illustrate the invention.

EXAMPLE 1

A solution of 19.4 g. N-2,4-dimethylphenyl-N'-methylformamidine and 0.3 g. p-toluenesulphonic acid in 195 ml. dry xylene was refluxed under anhydrous conditions for 48 hours, causing the evolution of methylamine. The xylene was distilled off under reduced pressure and the solid residue was crystallized twice from isopropyl alcohol to give 1,5-di-(2,4-dimethylphenyl)-3-methyl-1,3,5-triazapenta-1,4-diene, M.P. 88–89° C. A satisfactory elemental analysis was obtained.

The formamidine used in the above preparation was obtained in the following manner. A mixture of 55.1 g. 2,4-dimethylaniline hydrochloride, 83.7 g. p-toluenesulphonyl chloride and 150 ml. N-methylformamide was stirred with occasional cooling to maintain the temperature at 20–35° C. When the exothermic reaction had subsided, the mixture was stirred at room temperature for 4 hours, poured into a mixture of ice and water, and basified with 10 N sodium hydroxide solution, keeping the temperature of the mixture below 10° C. The precipitated solid was filtered, washed with water until free from alkali, dried at room temperature, and recrystallized from cyclohexane to give N-2,4-dimethylphenyl-N'-methylformamidine, M.P. 75–76° C.

EXAMPLE 2

In a similar way to that described in Example 1, using the reflux periods given below, the following 1,5-di-Z-3-methyl-1,3,5-triazapenta-1,4-dienes were prepared.

| Compound | Z | Reflux period (hrs.) | M.P. (° C.) |
| --- | --- | --- | --- |
| A | 2,3-dimethylphenyl | 72 | 124–126 |
| B | 2,6-dimethylphenyl | 72 | 138–140 |
| C | 2,4,6-trimethylphenyl | 96 | 96–97 |
| D | 2,4,5-trimethylphenyl | 96 | 103–104 |
| E | 2,3,4-trimethylphenyl | 48 | 133–134 |
| F | 2-bromo-4-methylphenyl | 96 | 126–127 |
| G | 2-fluoro-4-methylphenyl | 144 | 142–143 |
| I | 2-chloro-4-methylphenyl | 60 | 137–139 |
| J | 2-chloro-4,6-dimethylphenyl | 72 | 122–124 |
| K | 2-bromo-4,6-dimethylphenyl | 72 | 130–131 |
| L | 2,4-dichloro-6-methylphenyl | 72 | 165–166 |
| M | 2-methyl-4-methoxyphenyl | 72 | 71–73 |

Satisfactory elemental analyses were obtained for all of these compounds.

EXAMPLE 3

1,5-di-(2,4-dimethylphenyl) - 3 - methyl-1,3,5-triazapenta-1,4-diene, M.P. 88–89° C., was prepared as described in Example 1, except that no p-toluenesulphonic acid was added to the reaction mixture. A satisfactory elemental analysis was obtained.

EXAMPLE 4

A solution of 20 g. N-2,4-dimethylphenyl-N'-methylformamidine in a mixture of 22.8 g. ethyl trifluoroacetate and 20 ml. dry benzene was heated with stirring under anhydrous conditions at 50–60° C. for 8 hours. The mixture was distilled under reduced pressure to remove benzene, excess ethyl trifluoroacetate, and the by-products ethanol and N-methyltrifluoroacetamide formed in the reaction. The latter compound sublimed from the reaction mixture during the distillation step. The residual oil was diluted with 14 ml. isopropyl alcohol and the resulting solution cooled to give a crystalline product. This product was recrystallized from isopropyl alcohol to give 1,5-di-(2,4 - dimethylphenyl) - 3-methyl-1,3,5-triazapenta-1,4-diene, M.P. 88–89° C. A satisfactory elemental analysis was obtained.

EXAMPLE 5

A solution of 3.8 ml. dimethylcarbamoyl chloride in 10 ml. dry ether was added dropwise to a stirred solution of 6.5 g. N - 2,4-dimethylphenyl-N'-methylformamidine and 5.5 ml. triethylamine in 80 ml. dry ether at 0° C. The temperature of the stirred mixture was allowed to rise to room temperature, and the mixture was kept overnight at room temperature. The mixture was filtered and the filtrate concentrated under reduced pressure at room temperature to give a slurry of oil and solid which gradually solidified. This solid product was washed with 2 N hydrochloric acid, then with saturated aqueous sodium bicarbonate solution and finally with water. The resulting solid was dried and recrystallized from isopropyl alcohol to give 1,5-di-(2,4-dimethylphenyl)-3-methyl-1,3,5-triazapenta-1,4-diene, M.P. 88–89° C. A satisfactory elemental analysis was obtained.

EXAMPLE 6

A solution of 10 g. N-2,4-dimethylphenyl-N'-methylformamidine in 11 g. ethyl N-2,4-dimethylphenylformimidate was heated under anhydrous conditions with stirring for 25 hours on a steam bath. Ethanol formed in the reaction was allowed to distil off as it was produced. Final traces of ethanol were evaporated under reduced pressure, and the hot reaction mixture was diluted with 7 ml. methanol. The resulting solution was cooled to give a crystalline product which was recrystallized from isopropyl alcohol to give 1,5-di(2,4-dimethylphenyl)-3-methyl-1,3,5-triazapenta-1,4-diene, M.P. 88–89° C. A satisfactory elemental analysis was obtained.

The formimidate starting material used in the above preparation was prepared in the following manner. A mixture of 500 ml. ethyl orthoformate, 242 g. 2,4-dimethylaniline, 0.1 g. 2,4-dimethylaniline hydrochloride and 1000 ml. acetonitrile was introduced into a distillation apparatus. The mixture was heated for 5 hours on a steam bath, allowing ethanol and acetonitrile to distil off. Excess ethyl orthoformate was removed by distillation under reduced pressure and the residue distilled further in a high vacuum to give ethyl N-2,4-dimethylphenylformimidate, B.P. 65°/0.3 mm.

EXAMPLE 7

2,4-dimethylaniline (55 g.) was added dropwise during 5 hours to a stirred mixture of 73.8 g. N-2,4-dimethylphenyl-N'-methylformamidine, 85 ml. ethyl orthoformate and 1.5 ml. glacial acetic acid heated on a steam bath. Ethanol formed in the reaction was allowed to distil off as it was produced. The stirred reaction mixture was heated on the steam bath for a further 40 hours. Excess ethyl orthoformate and final traces of ethanol were removed by evaporation under reduced pressure, and the reaction mixture was cooled to give a solid product which was recrystallized from isopropyl alcohol to give 1,5-di-(2,4-dimethylphenyl) - 3 - methyl-1,3,5-triazapenta-1,4-diene, M.P. 88–89° C. A satisfactory elemental analysis was obtained.

EXAMPLE 8

Liquid methylamine (1.55 g.) at −30° C. was added to 17.7 g. ethyl N - 2,4-dimethylphenylformimidate at the same temperature in a Pyrex glass tube. The tube was sealed and heated in a steam bath for 70 hours. Ethanol was removed from the reaction mixture by evaporation under reduced pressure and the hot residue was diluted with 5 ml. methanol. The resulting solution was cooled, causing the crystallization of 1,5-di-(2,4-dimethylphenyl)-3-methyl-1,3,5-triazapenta-1,4-diene, M.P. 88–89° C. Recrystallization from propan-2-ol gave an analytical sample of this compound for which a satisfactory elemental analysis was obtained.

EXAMPLE 9

A solution of 8.2 g. N-2,4-dimethylphenyl-N'-methylformamidine in 10 g. ethyl N-4-chloro-2-methylphenylformimidate was heated with stirring on a steam bath for 20 hours. Ethanol formed in the reaction was allowed to distil off as it was produced. Final traces of ethanol were evaporated under reduced pressure and the hot reaction mixture was diluted with 7 ml. methanol. The resulting solution was cooled to give a crystalline product with M.P. 120–125° C. Analysis by gas-liquid chromatography and mass spectroscopy showed that this product was a mixture of 1,5 - di-(2,4-dimethylphenyl)-3-methyl-1,3,5-triazapenta - 1,4-diene, 1,5-di-(4-chloro-2-methylphenyl)-3-methyl - 1,3,5-triazapenta-1,4-diene and 1-(4-chloro-2-methylphenyl) - 5 - (2,4-dimethylphenyl)-3-methyl-1,3,5-triazapenta-1,4-diene. The first two compounds were isolated in pure form from the mixture by fractional crystallization from methanol.

EXAMPLE 10

In a similar way to that described in Example 9, using equimolecular proportions of the appropriate formamidine X—N=CH—NHCH$_3$ and formimidate $$Y—N=CH—OC_2H_5,$$

there were obtained reaction mixtures which were evaporated under reduced pressure to remove final traces of ethanol. The resulting residues were analyzed by gas-liquid chromatography and found to consist of mixtures of one unsymmetrical triazapentadiene and two symmetrical triazapentadienes of the hereinbefore described general Formulae VI, VII and VIII, in the amounts shown in the following table.

| Residue | Substituents on the phenyl ring in— | | Percent w./w. of— | | |
|---|---|---|---|---|---|
| | X' | Y' | VIII | VII | VI |
| I | 2,4-(CH$_3$)$_2$ | Nil | 45 | 23.8 | 14.2 |
| J | 4-Cl-2-CH$_3$ | Nil | 46 | 16.3 | 25.7 |
| K | 2,4-(CH$_3$)$_2$ | 2-CH$_3$ | 42.6 | 16.1 | 25.4 |
| L | 2,4-(CH$_3$)$_2$ | 2,3-(CH$_3$)$_2$ | 47.2 | 29.2 | 20.2 |

EXAMPLE 11

A mixture of 3.24 g. N-2,4-dimethylphenyl-N'-methylformamidine, 2.62 g. 2,4-dimethylphenyl isocyanide and 0.08 g. cuprous oxide was heated with stirring under anhydrous conditions for 5 hours on a steam bath. The hot reaction mixture was diluted with 5 ml. isopropyl alcohol and filtered to remove cuprous oxide. The filtrate was cooled to give a crystalline product which was recrystallized from isopropyl alcohol to give 1,5-di-(2,4-dimethylphenyl)-3-methyl-1,3,5-triazapenta - 1,4 - diene, M.P. 88–89° C. A satisfactory elemental analysis was obtained.

The 2,4-dimethylphenyl isocyanide used in the above preparation was prepared by reacting 2,4-dimethylformanilide with phosgene as described in Angew. Chem., 1965, 77(11) 492–504.

EXAMPLE 12

Liquid methylamine (1.2 g.) at −30° C. was added to a mixture of 10 g. 2,4-dimethylphenyl isocyanide and 0.4 g. cuprous oxide at the same temperature in a Pyrex glass tube. The tube was sealed and allowed to warm to room temperature. An exothermic reaction took place. When the exothermic reaction had subsided, the tube was heated in a steam bath for 15 hours. The hot reaction mixture was diluted with 10 ml. isopropyl alcohol and the resulting solution was cooled to give a crystalline product. This product was recrystallized from isopropyl alcohol to give 1,5-di-(2,4-dimethylphenyl)-3-methyl-1,3,5 - triazapenta-1,4-diene, M.P. 88–89° C. A satisfactory elemental analysis was obtained.

EXAMPLE 13

A solution of 2.9 g. N-(4-chloro-2-methylphenyl)-N'-methylformamidine and 0.1 g. p-toluenesulphonic acid in 10 ml. xylene was refluxed for 51 hours, causing the evolution of methylamine. The xylene was distilled off from the reaction mixture and the cooled residue triturated with 25 ml. petroleum ether (B.P. 60–80° C.) to give a solid product. This product was recrystallized from n-propanol to give 1,5-di-(4-chloro-2-methylphenyl)-3-methyl-1,3,5-triazapenta-1,4-diene, M.P. 163–164° C.

A similar preparation was carried out, without any p-toluenesulphonic acid in the reaction mixture. The same product was obtained, M.P. 163–164° C. Satisfactory elemental analyses were obtained in both cases.

The starting material for the above reactions was prepared in the following way. A mixture of 62.3 g. 4-chloro-2-methylaniline hydrochloride, 83.7 g. p-toluenesulphonyl chloride and 150 ml. N-methylformamide was stirred with occasional cooling to maintain the temperature at 20–35° C. When the exothermic reaction had subsided, the mixture was stirred at room temperature for 4 hours, poured into a mixture of ice and water, and the mixture basified with 10 N sodium hydroxide solution. The precipitated solid was filtered, washed with water until free from alkali, dried, and recrystallized from cyclohexane to give N-(4-chloro-2-methylphenyl)-N'-methylformamidine, M.P. 95–96° C.

EXAMPLE 14

In a similar way to that described in Example 13, 4-bromo-2-methylaniline was converted to N-(4-bromo-2-methylphenyl)-N'-methylformamidine, M.P. 106–107° C. (from cyclohexane). A solution of 17.2 g. of this compound and 0.2 g. p-toluenesulphonic acid in 175 ml. dry xylene was refluxed for 48 hours, causing the evolution of methylamine. The xylene was distilled off under reduced pressure and the solid residue was recrystallized from petroleum ether (B.P. 80–100° C.) to give 1,5-di-(4-bromo-2-methylphenyl)-3-methyl-1,3,5-triazapenta - 1,4-diene, M.P. 152–153° C. A satisfactory elemental analysis was obtained.

EXAMPLE 15

N-(4-bromo-2-methylphenyl)-N' - methylformamidine (11.4 g.) was heated for 66 hours under nitrogen by means of an oil bath at a temperature of 170° C. Methylamine was evolved. The resulting melt crystallized slowly on cooling, becoming entirely solid. This product was recrystallized twice from n-propanol to give 1,5-di-(4-bromo-2-methylphenyl)-3-methyl-1,3,5-triazapenta - 1,4 - diene, M.P. 149–150° C. Further recrystallization from petroleum ether (B.P. 80–100° C.) gave a pure sample, M.P. 153° C. A satisfactory elemental analysis was obtained.

EXAMPLE 16

In a similar way to that described in Example 13, 4-chloro-2-ethylaniline was converted to N-(4-chloro-2-ethylphenyl)-N'-methylformamidine, M.P. 75–79° C. (from petroleum ether, B.P. 60–80° C.). A solution of 5 g. of this compound and 0.1 g. p-toluenesulphonic acid in 50 ml. dry xylene was refluxed for 3.5 days. The xylene was distilled off under reduced pressure to give a residue which was chromatographed over neutral alumina using chloroform as the solvent and eluent. The eluate was evaporated to dryness and the residue recrystallized four times from petroleum ether (B.P. 40–60° C.) to give 1,5-di-(4-chloro-2-ethylphenyl)-3-methyl-1,3,5-triazapenta - 1,4 - diene, M.P. 65–67° C. A satisfactory elemental analysis was obtained.

EXAMPLE 17

Benzenesulphonyl chloride (35.4 g.) was added dropwise with stirring during 20 minutes to a solution of 11.8 g. N-methylformamide in 100 ml. dry pyridine, maintaining the temperature at −10° C. The mixture was stirred at −10° C. for 40 minutes, and 25 g. 4-fluoro-2-methylaniline added dropwise during 10 minutes. The mixture was allowed to warm to room temperature, heated at 90–95° C. for 30 minutes, and then cooled to room temperature. The resulting solution was poured into a mixture of ice and water and the mixture basified below 15° C. with 10 N sodium hydroxide solution. The mixture was extracted with chloroform (3 × 150 ml.). The extract was dried and evaporated to give a residual oil which solidified on trituration with a little methanol. This solid was repeatedly extracted with boiling petroleum ether (B.P. 60–80° C.; 5× 150 ml.). The extract was evaporated to give a solid residue which was recrystallized from methanol with cooling to −78° C., and then recrystallized twice from petroleum ether (B.P. 60–80° C.) to give 1,5-di-(4-fluoro-2-methylphenyl)-3-methyl-1,3,5-triazapenta-1,4-diene, M.P. 120–121° C.

EXAMPLE 18

A test was carried out in which larvae of the cattle tick *Boophilus microplus* were sprayed with an aqueous solution or dispersion of the compound under test, and dried. Percentage mortality was recorded after 48 hours. Duplicate assessments were made at various concentrations of test compound in order to obtain approximate $LD_{50}$ values. The triazapentadienes of Examples 1, 13, 16 and 17, and the Compounds A, B, C, E, F, G, J, L and M of Example 2 had $LD_{50}$ values below 250 p.p.m. w./v., expressed as a concentration of test compound in the aqueous spray preparation.

EXAMPLE 19

An assessment of ovo-larvicidal activity against *Tetranychus urticae* was made in the following way. Freshly laid eggs of *Tetranychus urticae* on a French bean leaf disc 2 cm. in diameter were sprayed with an aqueous dispersion of the compound under test. After 10 days any live larvae on the leaf disc were counted and the percentage mortality assessed. Triplicate assessments were made at various concentrations of test compound in order to obtain approximate $LD_{50}$ values, expressed as p.p.m. w./v. of test compound in the aqueous spray. The triazapentadiene of Example 1 and Compound D of Example 2 gave $LD_{50}$ values below 20 p.p.m.

EXAMPLE 20

A dispersible powder was prepared by grinding together a mixture of the following ingredients.

| | Percent w./w. |
|---|---|
| 1,5-di-(2,4-dimethylphenyl) - 3 - methyl-1,3,5-triazapenta-1,4-diene | 25.0 |
| Sodium N-methyl-N-palmitoyltaurate | 6.0 |
| Sodium di-octylsulphosuccinate | 0.5 |
| Celite | 68.5 |

Similar dispersible powders were prepared in which the triazapentadiene in the above formulation was replaced by Compound B, C, D, E, F, G or J of Example 1, or the product of Example 13.

EXAMPLE 21

(a) An emulsifiable concentrate was prepared from the following ingredients.

| | Percent w./v. |
|---|---|
| 1,5-di-(2,4-dimethylphenyl) - 3 - methyl-1,3,5-triazapenta-1,4-diene | 25.0 |
| Calcium dodecylbenzenesulphonate | 2.5 |
| Nonylphenoxypolyethoxyethanol [1] | 2.5 |
| Xylene, anhydrous to | 100.0 |

[1] A nonylphenol-ethylene oxide condensate containing an average of 14 mols ethylene oxide per mol of nonylphenol.

(b) An emulsifiable concentrate was prepared in which the xylene in the above formulation was replaced by anhydrous isophorone.

Further emulsifiable concentrates were prepared in which the triazapentadiene in the above formulations (a) and (b) was replaced by Compound B, C, D or E of Example 1.

EXAMPLE 22

A dusting powder was prepared by grinding together the following ingredients in a hammer mill.

| | Percent w./w. |
|---|---|
| 1,5-di-(2,4-dimethylphenyl) - 3 - methyl-1,3,5-triazapenta-1,4-diene | 3.0 |
| Celite | 20.0 |
| Talc | 77.0 |

A similar dusting powder was prepared in which the triazapentadiene in the above formulation was replaced by 1,5-di-(4-chloro-2-methylphenyl) - 3 - methyl-1,3,5-triazapenta-1,4-diene.

EXAMPLE 23

A dispersible powder was prepared by grinding a mixture of 1,5-di-(4-chloro-2-methylphenyl)-3-methyl-1,3,5-triazapenta-1,4-diene (20 parts), Ethylan R (5 parts) and kaolin (75 parts). All parts are by weight. Ethylan R is a proprietary dispersing agent ex Lankro Chemicals and is an ethoxylated ceto-stearyl alcohol.

EXAMPLE 24

A dispersible powder was prepared by grinding together a mixture of 1,5-di-(4-chloro-2-methylphenyl)-3-methyl-1,3,5-triazapenta-1,4-diene (81.5 parts), colloidal silicic acid (9.0 parts) and Ethylan TU (9.5 parts). All parts are by weight. Ethylan TU, a proprietary dispersing agent ex Lankro Chemicals, is an ethoxylated nonylphenol.

This formulation may be mixed with water to a concentration of active ingredient of 0.25% w./w. to form an aqueous dispersion suitable for dipping or spraying cattle.

We claim:

1. A compound of the general formula

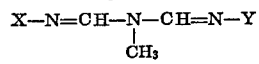

in which X and Y are identical and are each selected from the group consisting of 2,3-dimethylphenyl, 2,4-dimethylphenyl, 2,6-dimethylphenyl, 2,4,6-trimethylphenyl, 2,4,5-trimethylphenyl, 2,3,4-trimethylphenyl, 2-methyl-4-halophenyl, 2-ethyl-4-halophenyl, 2-halo-4-methylphenyl, 2-halo-4,6-dimethylphenyl, 2,4-dihalo - 6 - methylphenyl, and 2-methyl-4-methoxyphenyl.

2. A compound according to claim 1 in which X and Y are 2,4-dimethylphenyl.

3. A compound according to claim 1 in which X and Y are 4-chloro-2-methylphenyl.

4. A compound according to claim 1 in which X and Y are 4-fluoro-2-methylphenyl.

5. A compound according to claim 1 in which X and Y are 2-bromo-4-methylphenyl.

6. A compound according to claim 1 in which X and Y are 2,4,5-trimethylphenyl.

7. A compound according to claim 1 in which X and Y are 2,4,6-trimethylphenyl.

References Cited

UNITED STATES PATENTS

| 3,282,953 | 11/1966 | Wirt | 260—564 R X |
| 3,394,397 | 7/1968 | Duerr et al. | 260—564 R |
| 3,502,720 | 3/1970 | Arndt et al. | 260—564 |
| 3,378,437 | 4/1968 | Arndt et al. | 260—564 |

FOREIGN PATENTS

| 219,870 | 1/1970 | Japan | 260—564 |

LEON ZITVER, Primary Examiner

G. A. SCHWARTZ, Assistant Examiner

U.S. Cl. X.R.

424—326